United States Patent [19]
Norwood

[11] 3,914,844
[45] Oct. 28, 1975

[54] APPARATUS FOR SEATING POULTRY FEATHER PLUCKING FINGERS

[76] Inventor: Haskell J. Norwood, R.F.D. No. 1, Geraldine, Ala. 35974

[22] Filed: Feb. 6, 1974

[21] Appl. No.: 439,905

[52] U.S. Cl. .................. 29/235; 29/252; 29/451
[51] Int. Cl.² ........................................ B23P 19/02
[58] Field of Search ..................... 29/235, 451, 252

[56] References Cited
UNITED STATES PATENTS

| | | | |
|---|---|---|---|
| 550,560 | 11/1895 | Myers | 29/235 UX |
| 2,468,286 | 4/1949 | Behlert | 29/235 |
| 2,475,732 | 7/1949 | Yeo | 29/235 UX |
| 2,657,818 | 11/1953 | Mueller | 29/235 |

*Primary Examiner*—Charlie T. Moon

[57] ABSTRACT

A method is disclosed mounting a resilient poultry feather plucking finger to a rigid finger support with a peripheral groove in the head portion of the finger seated snugly within an aperture of the finger support and with an elongation portion of the finger projecting outwardly from the aperture. The method comprises the steps of passing at least part of the elongation portion of the finger through the finger support aperture and into a pair of elongated pincers, and moving the elongated pincers away from the rigid finger support towards one another thereby urging the finger head portion into the finger support aperture.

Apparatus is also disclosed for seating resilient poultry feather plucking fingers in apertures formed in rigid finger supporting structures. The apparatus comprises a cylinder, a piston mounted for reciprocal movement within the cylinder, a cylinder rod projecting out of the cylinder from the piston, finger gripping means pivotally mounted to the piston rod, and camming means mounted to the cylinder aside the finger gripping means to limit pivotal movement of the finger gripping means.

7 Claims, 2 Drawing Figures

APPARATUS FOR SEATING POULTRY FEATHER PLUCKING FINGERS

BACKGROUND OF THE INVENTION

Today, poultry processing plants commonly employ machines for picking or plucking feathers from poultry. Such machines, which are exemplified by those illustrated in U.S. Pat. Nos. 3,044,108, 3,197,890, 3,203,035, 3,234,587, 3,234,588, 3,235,904, 3,747,159, typically employ drums or discs having sets of holes or apertures in which resilient feather plucking fingers of unitary rubber construction are mounted. As shown in detail in U.S. Pat. No. 3,203,035 the feather plucking fingers typically comprise a head portion having a peripheral groove seated within an aperture formed in the drum or plate. From the head portion extends an elongation portion which includes a shank and a feather plucking section. The feather plucking section is provided with a furrowed surface which, when moved against feathers, tends to pluck them from the skin of the birds. To achieve this action the birds are directed over the drums which rotate and thereby urge the fingers against the bird feathers.

Poultry feather plucking machines of the type just described employ a relatively large number of feather plucking fingers. Ordinarily, these fingers are mounted directly to the supporting drum or plate by hand. This is accomplished by manually inserting the feather plucking sections of the fingers through the holes until the base portions engage the hole lips. From this point it is necessary to apply substantial force in urging the grooves formed about the peripheries of the finger heads into seating relation within the apertures. This application of substantial force is both fatiguing to the assembler as well as time-consuming and costly.

General objects of the invention are thus to provide improved methods and apparatuses for seating resilient poultry feather plucking fingers within apertures formed in rigid finger supporting structures.

SUMMARY OF THE INVENTION

Briefly described, a method is provided for mounting a resilient poultry feather plucking finger to the rigid finger support with a peripheral groove in the head portion of the finger seated snugly within an aperture in the finger support, and with an elongation portion of the finger projecting outwardly from the support aperture. In one preferred form the method comprises the steps of passing at least part of the elongation portion of the finger through the finger support aperture and into a pair of pincers, and moving the pincers away from the rigid finger support and towards one another thereby urging the finger head portion into the support aperture.

In another form of the invention apparatus is provided for seating resilient poultry feather plucking fingers in apertures formed in rigid finger supporting structures. The apparatus comprises a cylinder, a piston mounted for reciprocal movement within the cylinder, a piston rod projecting out of the cylinder from the piston, finger gripping means pivotally mounted to the piston rod, and camming means mounted to the cylinder aside the finger gripping means to limit pivotal movement of the finger gripping means.

DETAILED DESCRIPTION OF THE DRAWING

Figure 1:
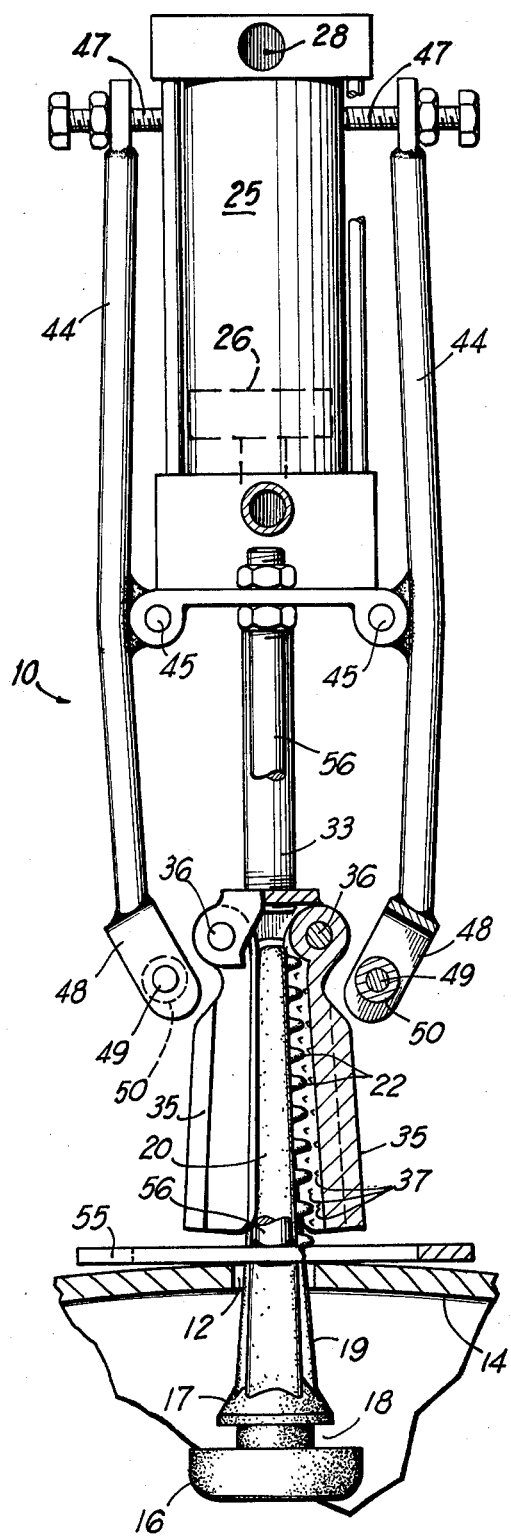
FIG. 1 is a side view in elevation of apparatus embodying principles of the invention in a preferred form shown engaging a resilient poultry feather plucking finger for seating within an aperture formed in a rigid finger support in accordance with methods also embodying principles of the invention.
Figure 2:
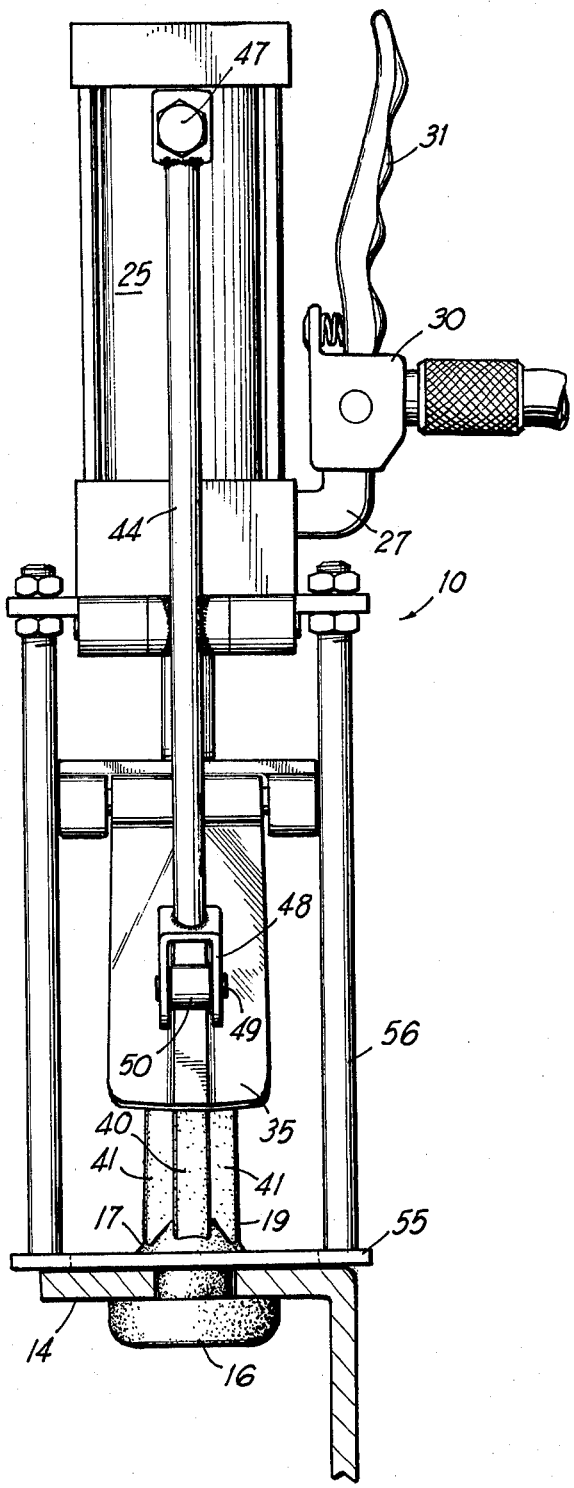
FIG. 2 is an elevational view of another side of the apparatus depicted in FIG. 1 shown engaging a poultry plucking finger firmly seated within the aperture of the finger support shown in FIG. 1.

Referring now in more detail to the drawing there is shown apparatus 10 which may be used in seating a resilient poultry feather plucking finger within an aperture 12 of a rigid finger supporting drum 14. Such fingers are usually composed of rubber and generally comprise a head portion from which an elongation portion extends. The head portion of the finger shown in the drawing for illustrative purposes is seen to include a base 16 and a conical section 17 separated by a peripheral groove 18. The elongation portion includes a shank 19 and a furrowed feather plucking section 20 having a set or ridges 22 separated by a set of troughs on two sides thereof.

Apparatus 10 itself is seen to comprise a cylinder 25 in which is housed a piston 26 for reciprocal movement within the cylinder. A piston rod 33 extends from the piston to the exterior of the cylinder. The cylinder is provided with an air inlet 27 at its lower end and an air outlet 28 at its upper end. The air inlet is connected to a valve 30 adapted for actuation by manual depression of a valve handle 31.

To the end of piston rod 33 distal cylinder 25 is mounted a pair of pincers or jaws 35 by means of pivot pins 36. The inside surfaces of the pincers have a series of small pits 37 to provide a rough inner surface for frictional engagement with feather plucking fingers. The outer surfaces of the pincers include a knoll or ridge 40 from each side of which two flanges 41 laterally extend. Two arms 44 are mounted to cylinder 25 by means of pivot pins 45. Through holes in the upper end of arms 44 are threaded two stop screws 47. The lower ends of arms 44 bifurcate into forks 48 in which roller pins 49 are journalled upon which rollers 50 are rotatably mounted within the forks. A centrally apertured support plate 55 is mounted to cylinder 25 beneath the pincers by means of two parallel posts 56.

In seating a resilient poultry feather plucking finger within aperture 12 of drum 14 the base portion of the finger may be manually gripped and inserted upwardly through the aperture with plate 55 positioned upon the outer surface of the drum about support aperture 12. The furrowed feather plucking section is then urged to the position shown in FIG. 1 where it is fully inserted within the pincers. In this position the pincers, which tend to hang vertically from pivot pin 36 due to gravity, exert sufficient frictional engagement upon the furrowed portion of the finger to permit the assembler to withdraw his hand from the head portion without risk of the finger falling out of the support aperture. Valve handle 31 may now be actuated to enable high pressure air to pass through the valve and into the interior of cylinder 25 thereby urging piston 26 upwardly. This upward movement of the piston causes piston rod 33 likewise to move upwardly and away from drum 14.

As piston rod 33 moves away from the drum ridge portions 40 of the pincers are guided by forks 48 into engagement with rollers 50. During this initial movement finger shank portion 19 has yet to engage the surface of drum 14 defining aperture 12. As a consequence the finger has encountered little resistance to upward movement enabling the finger elongation portion thereof to be maintained within the pincers by virtue of the frictional engagement established manually in urging the finger through the pincers as well as by the convergent force created by the tendency of the pincers to hang vertically from pivot pins 36 against ridges 22 at the furrowed section of the finger elongation. As shank 19 engages the aperture defining surface of drum 14 increased resistance is encountered by the finger. However, about this time rollers 50 begin to exert lateral pressure by camming action against the pincers due to engagement of stop screws 47 with the sides of cylinder 25. Continued upward travel of piston rod 33 brings conical section 17 of the finger head portion into engagement with the sides of aperture 12. This engagement presents a substantial load upon a cylinder and piston rod 33. At this time, however, pincers 22 have advanced upwardly through the constriction of space provided by rollers 50 to a point where very substantial pressure is exerted by the rollers against the pincers. The resulting gripping force of the pincers against the finger enables the cylinder to pull the conical section of the finger head on through the aperture without the furrowed finger elongation slipping out of the pincers. Once groove 18 is seated within aperture 12 upward movement of piston 26 is arrested. The apparatus may then be withdrawn by loosening stop screws 47 or, if desired, by provision of a piston reverse actuation mechanism and a lengthening modification of the pincers.

It should be understood that the just-described embodiment merely illustrates principles of the invention in preferred forms. Many modifications may, of course, be made to the apparatus and method described without departure from the spirit and scope of the invention as set forth in the following claims.

What is claimed is:

1. Apparatus for seating resilient poultry feather plucking fingers in apertures formed in rigid finger supporting structures, said apparatus comprising a cylinder, a piston mounted for reciprocal movement within said cylinder, a cylinder rod projecting out of said cylinder from said piston, finger gripping means pivotally mounted to said piston rod, and camming means mounted to said cylinder aside said finger gripping means to limit lateral separating pivotal movement of said finger gripping means.

2. The apparatus of claim 1 wherein said finger gripping means includes a pair of pincers.

3. The apparatus of claim 1 wherein said camming means includes two arms and two rollers rotatably supported by said arms adjacent opposite sides of said finger gripping means.

4. The apparatus of claim 3 wherein said arms are pivotally mounted to said cylinder and wherein said apparatus includes adjustable stop means for limiting pivotal movement of said camming means arms.

5. The apparatus of claim 1 comprising a support plate mounted to said cylinder adjacent an end of said gripping means distal said cylinder.

6. Apparatus for seating resilient poultry feather plucking fingers in apertures formed in rigid finger supporting structures, said apparatus comprising an actuation rod, a pair of pincers pivotally supported by said actuation rod for lateral movement with respect to each other, and camming means comprising a pair of forks rotatably supporting a pair of rollers mounted aside said pair of pincers to limit lateral separation of said pincers.

7. The apparatus of claim 6 comprising a pair of arms pivotally mounted to said cylinder to which said pair of forks is rigidly connected, and a pair of stop screws threaded through apertures formed in said pair of arms for limiting pivotal movement of said rollers away from said pincers.

* * * * *